United States Patent [19]

Ray

[11] Patent Number: 4,725,359

[45] Date of Patent: Feb. 16, 1988

[54] POTABLE WATER FROM INTERNAL COMBUSTION ENGINES

[75] Inventor: Roderick J. Ray, Bend, Oreg.

[73] Assignee: Bend Research, Inc., Bend, Oreg.

[21] Appl. No.: 704,868

[22] Filed: Feb. 25, 1985

[51] Int. Cl.$^4$ .............................................. B01D 13/00
[52] U.S. Cl. .............................. 210/640; 55/DIG. 30
[58] Field of Search ................. 55/DIG. 30; 210/640; 60/311

[56] References Cited

U.S. PATENT DOCUMENTS

| | | | |
|---|---|---|---|
| 3,511,031 | 5/1970 | Ketteringham et al. | 55/16 X |
| 3,732,695 | 5/1973 | Shaw | 55/DIG. 30 X |
| 3,950,247 | 4/1976 | Chiang et al. | 210/640 X |

Primary Examiner—Frank Spear
Attorney, Agent, or Firm—Chernoff, Vilhauer, McClung & Stenzel

[57] ABSTRACT

A method of and apparatus for obtaining potable water from the exhaust of an internal combustion engine is disclosed essentially comprising separating a water vapor permeate containing water vapor and noncondensable gases from the exhaust by a nonporous nonionic hydrophilic membrane, then separating the water vapor from noncondensable gases by either condensing the water vapor or compressing the entire water vapor permeate followed by condensation of the water vapor contained in the permeate.

16 Claims, 10 Drawing Figures

HOLLOW-FINE FIBER WATER-VAPOR RECOVERY MODULE 4,725,359

POTABLE WATER FROM INTERNAL COMBUSTION ENGINES

The government has rights in this invention pursuant to Department of Defense Contract No. DAAE07-84-C-R067.

BACKGROUND OF THE INVENTION

This invention relates to a method and apparatus for obtaining water suitable for consumption and other use by humans and animals from the exhaust of internal combusion engines.

Generation of potable water is highly desirable in a wide variety of circumstances, such as in arid or contaminated environments, at sea, or in sub-freezing environments. A possible source of water is the water vapor present in the exhaust from internal combustion engines. Most internal combustion engines in use today burn high-grade fuels such as gasoline or diesel. The exhaust stream from these engines is made up primarily of nitrogen, carbon dioxide, and water vapor, with smaller amounts of carbon monoxide, unburned hydrocarbons, and other impurities also present. Analyses of typical exhaust streams indicate that for every gallon of fuel consumed about 1 gallon of water vapor is formed. Recovery of all such water vapor would therefore mean the generation of as much water as fuel consumed for a given engine, while a system capable of recovering only 50 percent of the water vapor in the exhaust stream that consumes, for example, 10 gallons of fuel per hour, would provide about 5 gallons of water per hour.

Previous attempts to recover water from internal combustion engine exhaust have focused on cooling the hot exhaust stream so as to condense the water vapor contained therein. Such attempts have been unsuccessful due to the large amount of energy required to sufficiently cool the exhaust stream, the complexity of the associated refrigeration equipment and, most importantly, due to the highly contaminated nature of the condensed water obtained, thereby requiring extensive post-condensation treatment to render it potable.

There is thus a need for an inexpensive, energy-efficient, simple and practical method and apparatus of obtaining potable water from engine exhaust streams. It is therefore the principal object of the present invention to provide a method and apparatus of recovering potable water from internal combustion engine exhaust that meets such requirements. This and other objects are accomplished by the present invention, which is summarized and described in detail below.

SUMMARY OF THE INVENTION

The present invention comprises a newly-discovered application of known processes that include as one of their steps the membrane separation of water vapor from a gaseous stream containing water vapor and other generally noncondensable gases. According to the present invention, the exhaust from an internal combustion engine is cooled to about 65°–150° C. and contacted with one side of a nonporous nonionic hydrophilic polymeric membrane that is highly permeable to water vapor and relatively impermeable to all other components of the exhaust; a vacuum applied to the other side of the membrane draws nearly pure water vapor through the membrane in a permeate stream leaving virtually all other noncondensable exhaust components behind. Water can then be recovered from the permeate stream containing mostly water vapor and a small amount of residual noncondensable gases by two separate process schemes. In one process scheme, the water vapor component is condensed under vacuum then the relatively small amount of noncondensable gas components permeating the membrane are compressed to ambient pressure by a vacuum pump and released to the atmosphere. Alternatively, the entire membrane permeate is compressed with a vacuum to ambient pressure and then the water vapor therein is condensed to yield substantially pure liquid water. Depending upon membrane performance and taste and purity requirements, minor further treatment, such as charcoal filtration, may be used.

DETAILED DESCRIPTION OF THE INVENTION

In U.S. Pat. Nos. 4,444,571 and 4,466,202, there are disclosed energy-efficient processes for stripping gases from liquids and for evaporation with vapor recovery, respectively, both patents disclosing the use of membranes which are substantially permeable to water vapor and substantially impermeable to certain other gaseous components. Such membranes, as well as certain other types of membranes, have been found to be useful in the process and apparatus of the present invention.

The useful membranes are made from hydrophilic polymers and are generally described as nonporous nonionic hydrophilic polymeric reverse-osmosis desalination membranes, dialysis membranes, and gas separation membranes.

Examples of suitable reverse-osmosis desalination-type membranes are interfacially-polymerized composite reverse-osmosis membranes such as are made by interfacial reaction of polyethyleneimine with isophthaloyl chloride at one surface of a microporous polysulfone substrate, and a polyamide formed from piperazine and a mixed acyl halide reagent, both described by Cadotte et al. in "Interfacial Synthesis in the Preparation of Reverse Osmosis Membranes," *J. Macromol. Sci. Chem.* A15(1981)727. Other examples are the more conventional asymmetric reverse-osmosis membranes formed from a casting solution of cellulose acetate, acetone, magnesium perchlorate, and water, from which it is possible to prepare hydrophilic membranes known in the art as the Loeb-Sourirajan type described by Loeb et al. in *Adv. Chem. Ser.* 38(1962)117. Other exemplary membranes include the nitrogen-linked aromatic polyamide membranes described by Richter and Hoehn in U.S. Pat. No. 3,567,632.

Figure 1:
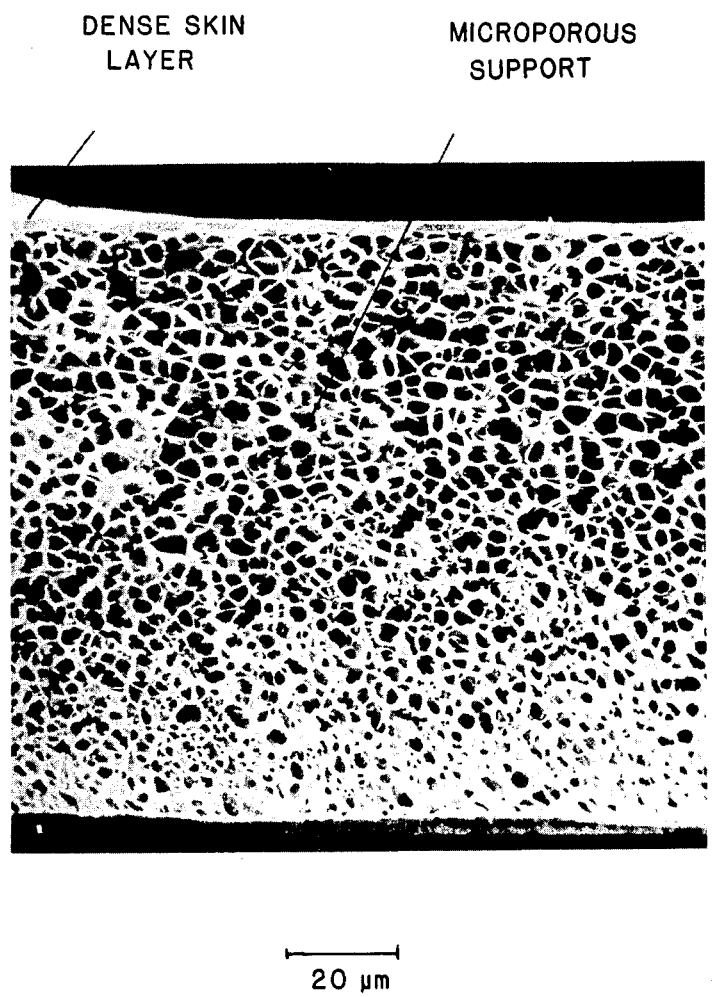
FIGS. 1 and 2 are cross-sectional scanning electron micrographs of suitable membranes for use in the process of the present invention.
Figure 3:
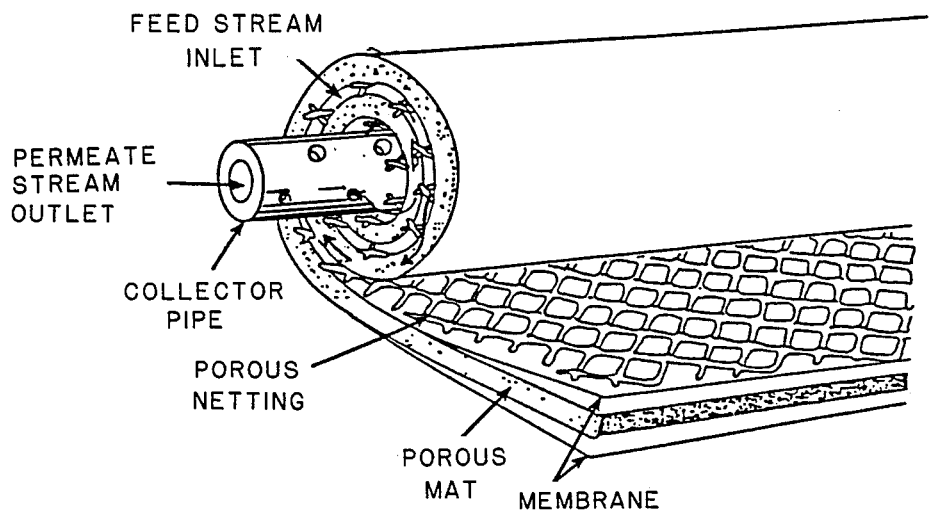
FIGS. 3 and 4 are schematic drawings of suitable membrane modules useful in the process of the present invention.

A preferred desalination-type membrane is an asymmetric cellulose acetate having a very thin (0.1 m or less) dense skin supported by a fairly porous (1.5–2.0 m diameter pores) substrate of the type shown in FIG. 1 and spirally wound with porous netting and mat, such as shown in FIG. 3. Such membranes are manufactured by Gracesep Manufacturing Company of Bend, Oreg.

Homogeneous flat sheet cellulosic membranes are also suitable for incorporation into spirally wound modules of the type shown in FIG. 3. Examples of such include those that are made and sold by the Olin Corporation of Stanford, Connecticut and that made and sold by Enka A. G. Wuppertal of West Germany under the trade name Cuprophan 80M.

Suitable gas separation-type membranes are exemplified by the silicone rubbers including dimethylsilicone and polydimethyl-siloxane described by Robb in *Ann. NY Academy of Sci.* 146(1967)119 and by Konikoff et al. in U.S. Pat. No. 3,303,105; organopolysiloxanepolycarbonate block copolymers as described by Ward et al. in *J. Memb. Sci.* 1(1976)99; cellulose and its esters including cellulose butyrate and cellulose acetate as described by Schell and Houston in *Chem. Engr. Progr.* 78:10(1982)33 and by Mazur and Chan in *Chem. Engr. Progr.* 78:10(1982)38; sulfonated 2,6-dimethyl polyisoprenes described by Barrie et al. in *Polymer* 16(1975)811; and polyvinylalcohol described by Spencer and Ibrahim in *J. Poly. Sci.: Part A-2* 6(1968)2067.

Other gas-separation-type membranes useful in the process of the present invention are those prepared from blends of cellulose diacetate and cellulose triacetate.

Still other water-permeable membrane polymers useful in the practice of the present invention include dialysis-type hollow fine fiber membranes of cellulose, ethyl cellulose, hydroxypropyl cellulose, regenerated cellulose, such as cuprammonium cellulose or rayon, cellulose esters, such as cellulose acetate, cellulose diacetate, cellulose triacetate, cellulose butyrate, and triacetate rayon, polyethyleneimine, polyacrylonitrile, polyvinylidine fluoride, polyacrylates, aliphatic polyamides including Nylon 66®, polybutadiene, aromatic polyamides, polyimides, polycarbonates, and polybenzimidazoles. When such hollow fine fibers are used, the feed stream is preferably passed into the tube side or lumens of the hollow fiber, with vacuum being applied to the outside or shell side of the fiber.

A preferred dialysis-type membrane is made of cuprammonium cel)ulose or rayon hollow fine fibers such as the type described in U.S. Pat. No. 3,888,771 and made by Asahi Chemical Industries of Tokyo, Japan.

Figure 5:
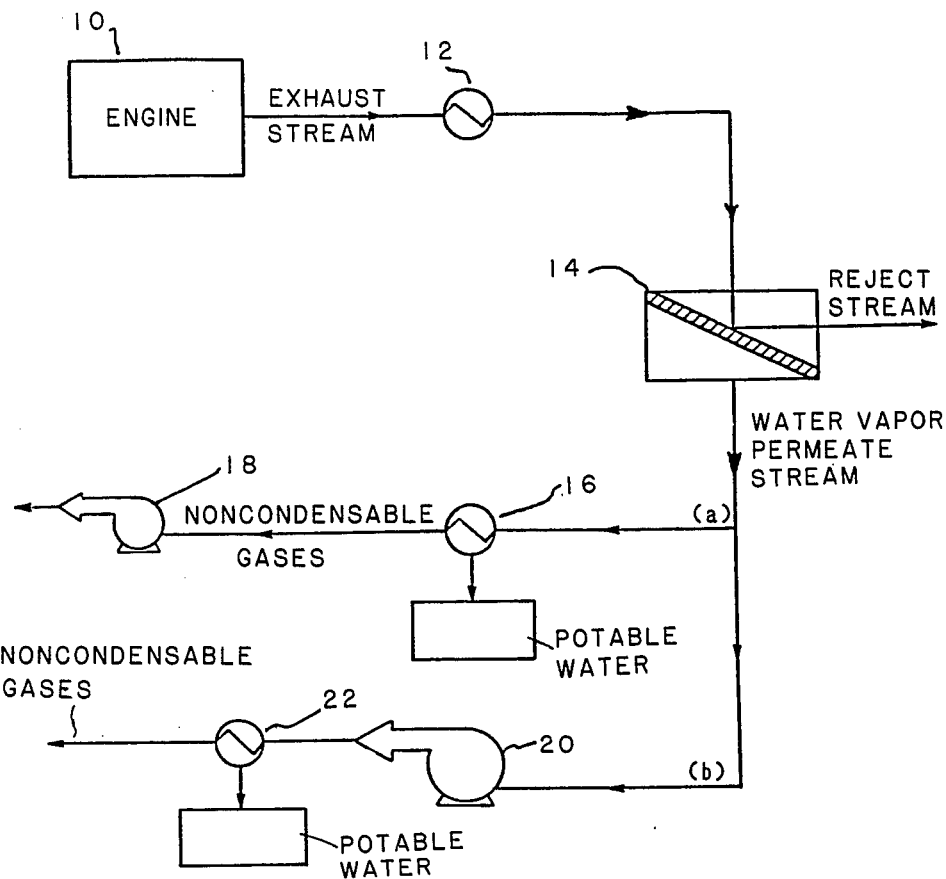
FIG. 5 is a schematic drawing of a system incorporating the process of the present invention and showing two methods of obtaining water from the membrane permeate stream.

In schematic FIG. 5 an exemplary basic system is illustrated. In accordance therewith, the exhaust stream from a hydrocarbon fuel-burning internal combustion engine 10 is first passed through a heat exchanger 12 to cool the stream to the range of approximately 65°–150° C., the stream then being contacted with a membrane 14 of the type described above, the pressure on the contact side of the membrane being substantially atmospheric (or elevated as in the case of pressurized feed), thereby forming a reject stream containing substantially all impurities and non-water components, and a water vapor permeate stream comprising two principal components: (1) a major portion of water vapor; and (2) a minor portion of residual noncondensable gases. The water vapor permeate stream is pulled through the membrane by a vacuum pump 18 or 20 which maintains the pressure on the permeate side of the membrane below the partial pressure of the water vapor in the exhaust stream. Liquid water can be obtained from the water vapor in the separated water vapor permeate stream in two ways, shown in FIG. 5(a) and (b). In one method, shown in FIG. 5(a), the water vapor component of the permeate stream is condensed in condenser 16 under vacuum whereafter the remaining noncondensable gases are compressed to about ambient pressure by vacuum pump 18 and released to the atmosphere. Alternatively, as shown in FIG. 5(b), a vacuum pump 20, possibly in combination with an interstage cooler if staged compressors are used, compresses or raises the stream's pressure to about ambient pressure, whereafter the water vapor component in the permeate stream is condensed in condenser 22 to liquid water and stored, the residual noncondensable gases being released to the atmosphere.

Figure 6:
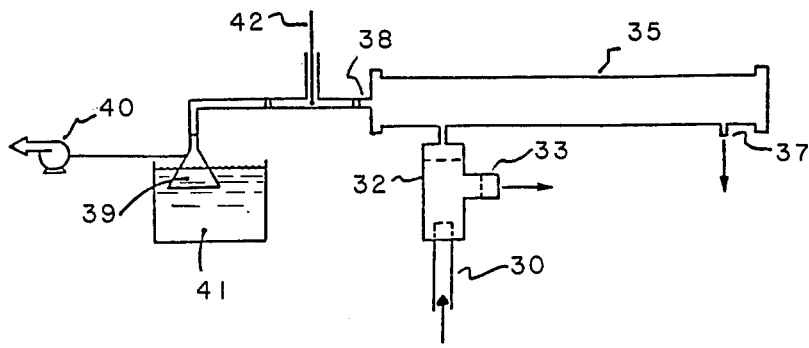
FIG. 6 is a schematic drawing of a working model of an onboard water-generation system according to the present invention.

An actual model on-board water generation system is illustrated in FIG. 6, wherein the exhaust from an internal combustion engine exhaust pipe 30 is delivered at substantially atmospheric pressure to a spirally-wound membrane of the type shown in FIG. 3, the membrane being encased in a cylindrical module 35, excess exhaust passing via manifold 32 having an exhaust port 33. The permeate side pressure of the membrane module is maintained below the partial pressure of water vapor in the exhaust stream by vacuum pump 40. The water vapor permeate containing a minor amount of noncondensable gases passes from the module via port 38 and is then cooled, condensed and collected in a vacuum flask 39 that is submerged in a cooling bath 41. The reject stream, comprising water vapor-depleted engine exhaust, is released through the reject port 37. Noncondensable gases having permeated the membrane are exhausted to the atmosphere by vacuum pump 40. Thermocouple 42 monitors the temperature of the water vapor permeate.

Depending upon taste and purity requirements, a charcoal filter may be used to post treat the water collected. Suitable filters are the in-line activated-carbon type, such as the activated-carbon cartridge filters made by AMF Cuno of Meridan, Conn.

EXAMPLES

EXAMPLE 1

Using apparatus of the type shown in FIG. 6 with a 7-ft$^2$ spirally-wound asymmetric cellulose acetate membrane module of the type shown in FIG. 3, the membrane having a cross-sectional composition substantially as shown in FIG. 1 and made by Gracesep Manufacturing Company of Bend, Oreg., the exhaust of a gasoline-burning internal combustion automobile engine was subjected to treatment by the method and apparatus of the present invention.

The exhaust was cooled to approximately 66° C. by convection and then contacted with the membrane, the initial relative humidity of the exhaust stream being 65% and the partial water vapor pressure therein being approximately 67 mmHg. Ambient temperature varied between 18° and 25° C. Pressure on the contact side of the membrane was substantially atmospheric at 680 mmHg, while that on the permeate side was maintained at approximately 15 mmHg. The water vapor permeate was passed to the vacuum flask submerged in water bath maintained at approximately −4° C., and 50 ml of clear water with a slight organic odor was obtained. Further treatment of the water with activated charcoal in filter paper yielded substantially the same amount of odorless potable water.

EXAMPLES 2

The method and apparatus of Example 1 were used to treat the exhaust from a diesel fuel-burning truck engine, the exhaust being cooled to about 93° C. and having an initial relative humidity of 45% and a partial water vapor pressure of 14 mmHg before being contacted with the membrane. Contact side pressure in the system was about 680 mmHg, while permeate side pressure was nominally 15 mmHg. Ambient temperature varied between 18° and 25° C. and the cooling bath was operated at about −4° C. 200 ml of clear water was obtained, the water being potable after charcoal filtration.

EXAMPLE 3

Figure 7:
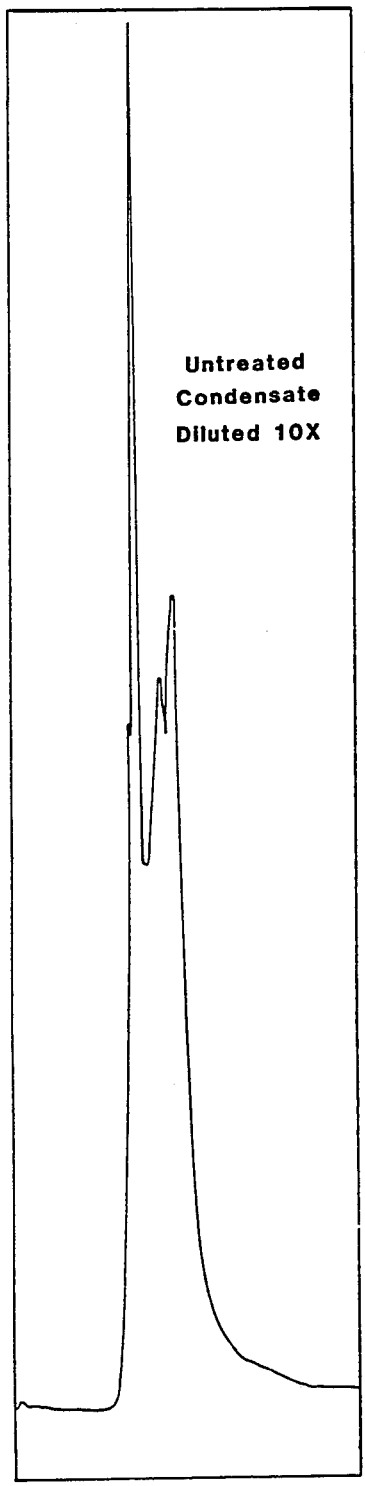
FIGS. 7, 8, 9 and 10 are high performance liquid chromatograph tracings of water obtained by, respectively, condensation of internal combustion engine exhaust, by the process of the present invention, by the process of the present invention including aftertreatment with charcoal, and of potable tap water.
Figure 8:
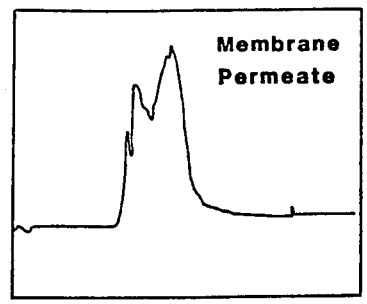
Figure 9:
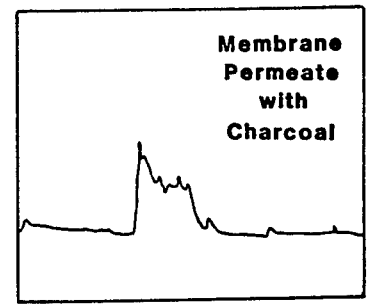
Figure 10:
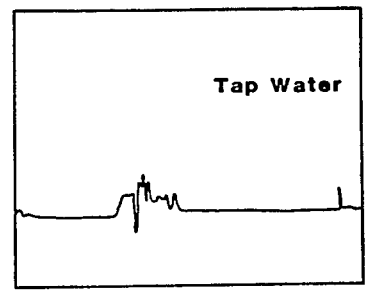

The relative purity of the water obtained in Example 2, both before and after charcoal filtration, was compared with water obtained from the same exhaust by condensation without use of the membranes of the present invention and also with potable city tap water. Samples were subjected to high performance liquid chromatograph (HPLC) studies at a wavelength of 280 nanometers and representative tracings made, which are shown in FIGS. 7–10. The peaks correspond to the presence of various hydrocarbons. FIG. 7 is an HPLC tracing of a water sample obtained by conventional direct condensation of water vapor contained in the diesel exhaust stream, the sample having been diluted to one-tenth its original composition for purposes of comparison. All HPLC tracings shown in FIGS. 7–10 were made on the same scale, thus revealing that water obtained by the process and apparatus of the present invention (shown in FIGS. 8 and 9) contained approximately one one-hundredth of the amount of impurities contained in water obtained by direct condensation alone. As is apparent from a comparison of FIGS. 7–10, water obtained from diesel exhaust according to the present invention is more pure than water obtained by conventional condensation by a factor of about 100, and compares quite favorably with potable tap water.

EXAMPLES 4-5

Figure 2:
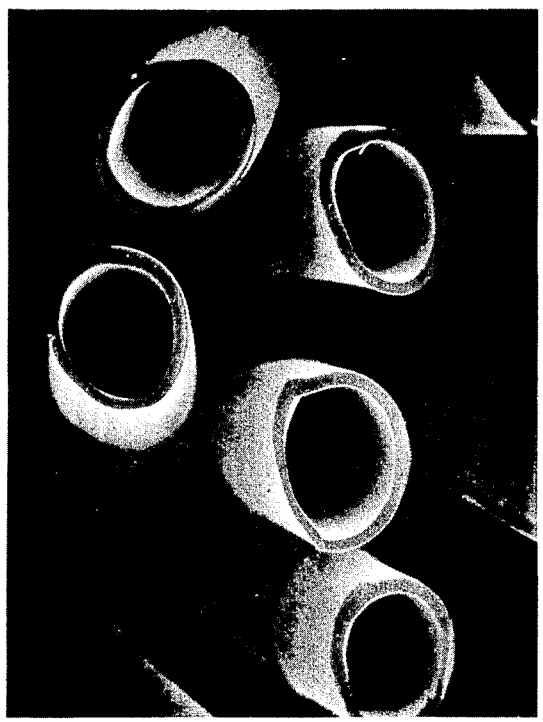
Figure 4:
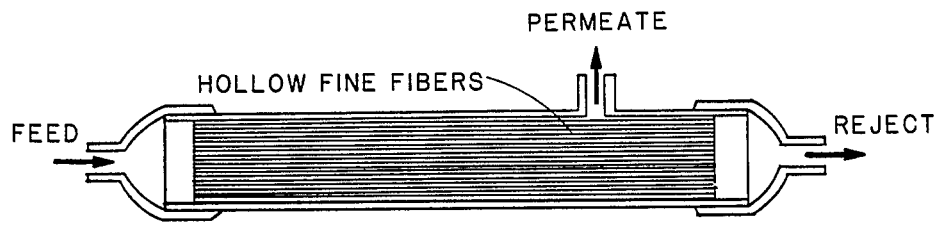

Using apparatus similar to the type shown in FIG. 6, tests were conducted on a module of the same type described in Example 1 and on a 16.2-ft² cuprammonium rayon hollow fine fiber module of the design shown in FIG. 4 having a cross-sectional composition as shown in the photomicrograph of FIG. 2, an inside diameter of 230=m, and a wall thickness of 11μm. Such fibers are described in detail in U.S. Pat. No. 3,888,771 and are made by Asahi Chemical Industries of Tokyo, Japan. A feed of simulated diesel exhaust comprising 74 mole % $N_2$, 13 mole % $CO_2$, and 13 mole % $H_2O$ was used.

The simulated diesel exhaust contacted the membrane at approximately 80° C. with an initial relative humidity of 32% and a water vapor partial pressure of approximately 98 mmHg. Ambient temperature was maintained at 85° C. pressure on the contact side or lumens of the membrane was about 710 mmHg, while that on the permeate or shell side was approximately 40 mmHg.

The performance of the two membranes was determined in terms of water flux and permeate water quality ($X_{H_2O}$) by measuring the water vapor flow rate, noncondensable-gas flow rate, and pressures of the feed reject and permeate streams. The results are shown in Table I.

TABLE I

| Membrane | Flux $\frac{cm^3 (STP)}{cm^2\text{-sec}} \times 10^4$ | Purity $X_{H_2O}$ |
| --- | --- | --- |
| Cellulose Acetate | 35.1 | 0.82 |
| Hollow Fine Fibers | 57.7 | 0.83 |

Using the results shown in Table I, the size of a membrane module required to produce a given amount of potable water can be calculated. For example, to produce 10 gallons of water per day from a typical diesel engine exhaust stream, the engine running an average of four hours per day, approximately 170 ft² of spiral-wound membrane surface area is required, while approximately 100 ft² of hollow fine fiber membrane surface area is needed. Given the packing density of the respective membrane types, such surface area is provided in the former case by a 6-inch diameter module that is 40 inches long and in the latter case by the same diameter module only 6 inches long.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited 30 only by the claims which follow.

What is claimed is:

1. A method of obtaining substantially pure water from the exhaust stream of an internal combustion engine comprising:
   (a) cooling said exhaust stream to a temperature between about 65° and 150° C.;
   (b) separating water vapor from said exhaust stream by contacting said exhaust stream with one side of a nonporous nonionic hydrophilic polymeric membrane that is substantially permeable to water vapor and substantially impermeable to noncondensable components of said exhaust stream so as to form (1) a reject stream comprising a major portion of noncondensable gases and a minor portion of hydrocarbon compounds and (2) a separated water vapor permeate on the permeate side of said membrane, said separated water vapor permeate comprising a major portion of water vapor and a minor portion of noncondensable gases; and
   (c) recovering substantially pure water from said separated water vapor permeate by separating said water vapor from said noncondensable gases.

2. The method of claim 1 wherein said recovery of substantially pure water is accomplished by condensation of said water vapor in said separated water vapor permeate followed by compression of said noncondensable gases in said separated water vapor permeate.

3. The method of claim 1 wherein said recovery of substantially pure water is accomplished by compression of said separated water vapor permeate followed by condensation of said water vapor in said separated water vapor permeate.

4. The method of claim 1 wherein said membrane is selected from interfacially-polymerized composite reverse osmosis membranes, asymmetric reverse osmosis membranes, dialysis membranes and gas separation membranes, said membranes being made of silicone rubbers, natural rubbers, synthetic rubbers, nylons, organopolysiloxanepolycarbonate block copolymers, cellulose, ethyl cellulose, hydroxypropyl cellulose, cellulose esters, sulfonated polyphenylene oxides, polyvinylalcohols, polyvinylidene fluoride, polyethyleneimines, polystyrene sulfonates, polyvinyl butyral, polyvinyl acetate, polyacrylonitrile, polymethacrylates, polyacrylics, polybutadiene, polyesters, polyamides, polyimides, polycarbonates, and polybenzimidazoles.

5. The method of claim 4 wherein said membrane is in the form of a module.

6. The method of claim 5 wherein said membrane comprises one or more spirally-wound asymmetric cellulose acetate membrane modules.

7. The method of claim 5 wherein said membrane comprises cuprammonium cellulose hollow fine fibers.

8. The method of claim 1 including the additional step of charcoal filtration of said substantially pure water.

9. The method of claim 1 wherein the pressure on the contact side of said membrane is substantially atmospheric and the pressure on the permeate side of said membrane is lower than the partial pressure of said water vapor in said exhaust stream.

10. The method of claim 1 wherein said cooling of said exhaust stream is accomplished by means selected from convection, radiation and heat exchange.

11. The method of claim 2 wherein said condensation of said water vapor in said separated water vapor permeate is by means of a condenser and said compression of said noncondensable gases in said separated water vapor permeate is by means of a vacuum pump.

12. The method of claim 3 wherein said compression of said separated water vapor permeate is by means of a vacuum pump and said condensation of said water vapor is by means of a condenser.

13. The method of claim 1 wherein said internal combustion engine is a hydrocarbon fuel-burning engine 14. The method of claim 13 wherein said hydrocarbon fuel is diesel.

15. The method of claim 13 wherein said hydrocarbon fuel is gasoline.

16. The method of claim 13 wherein said hydrocarbon fuel is methane.

* * * * *

UNITED STATES PATENT AND TRADEMARK OFFICE
CERTIFICATE OF CORRECTION

PATENT NO. : 4,725,359

DATED : February 16, 1988

INVENTOR(S) : Roderick J. Ray

It is certified that error appears in the above-identified patent and that said Letters Patent is hereby corrected as shown below:

| | |
|---|---|
| Col. 3, line 6 | Change "m" to --$\mu$m-- |
| Col. 3, line 7 | Change "m" to --$\mu$m-- |
| Col. 3, line 53 | change "cel)ulose" to --cellulose-- |
| Col. 5, line 8 | Change "EXAMPLES 2" to --EXAMPLE 2-- |
| Col. 5, line 57 | Change "230 = m" to --230 $\mu$m-- |
| Col. 6, line 36 | After "limited" delete --30-- |

Signed and Sealed this

Fourth Day of July, 1989

Attest:

DONALD J. QUIGG

*Attesting Officer*  *Commissioner of Patents and Trademarks*